(12) United States Patent
Jung et al.

(10) Patent No.: US 8,662,766 B2
(45) Date of Patent: Mar. 4, 2014

(54) LIGHT PATH ADJUSTMENT APPARATUS AND PHOTOGRAPHING APPARATUS INCLUDING THE SAME

(75) Inventors: Ki-oh Jung, Suwon-si (KR); Cheol-eun Jang, Suwon-si (KR); Sung-wook Choi, Changwon-si (KR); Woo-jong Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 140 days.

(21) Appl. No.: 13/150,506

(22) Filed: Jun. 1, 2011

(65) Prior Publication Data

US 2012/0082447 A1    Apr. 5, 2012

(51) Int. Cl.
*G03B 9/02* (2006.01)

(52) U.S. Cl.
USPC .......................................... 396/506; 359/233

(58) Field of Classification Search
USPC .......................................... 396/506; 359/233
See application file for complete search history.

(56) References Cited

U.S. PATENT DOCUMENTS

| | | | |
|---|---|---|---|
| 4,290,675 A * | 9/1981 | Beiser | 396/324 |
| 5,765,060 A * | 6/1998 | Shimizu | 396/268 |
| 5,892,994 A | 4/1999 | Inaba | |
| 5,997,187 A * | 12/1999 | Hamasaki | 396/449 |
| 6,269,223 B1 | 7/2001 | Lo et al. | |
| 6,466,746 B2 | 10/2002 | Inaba | |
| 6,546,208 B1 | 4/2003 | Costales | |
| 6,807,295 B1 | 10/2004 | Ono | |
| 7,019,780 B1 | 3/2006 | Takeuchi et al. | |
| 2003/0161625 A1* | 8/2003 | Kamata | 396/494 |
| 2005/0025478 A1* | 2/2005 | Fujinaga | 396/493 |
| 2011/0249175 A1* | 10/2011 | Lo | 348/362 |
| 2012/0057859 A1* | 3/2012 | Byon et al. | 396/510 |
| 2013/0027524 A1* | 1/2013 | Park et al. | 348/49 |

* cited by examiner

*Primary Examiner* — Christ Mahoney
*Assistant Examiner* — Fang-Chi Chang
(74) *Attorney, Agent, or Firm* — Drinker Biddle & Reath LLP

(57) ABSTRACT

A light path adjustment apparatus includes a support plate that has a first through hole through which light passes and optical units that move between an open location where the first through hole is opened by the optical units moving toward an outside of the first through hole and a closing location where the first through hole is divided into a plurality of regions by the plurality of optical units moving toward the first through hole. The optical units block at least a part of the light in the closing location.

18 Claims, 11 Drawing Sheets

FIG. 2
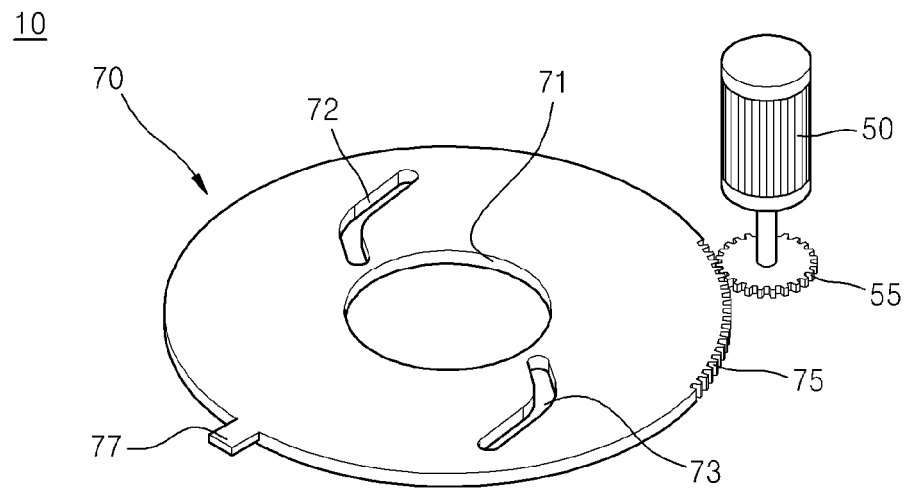
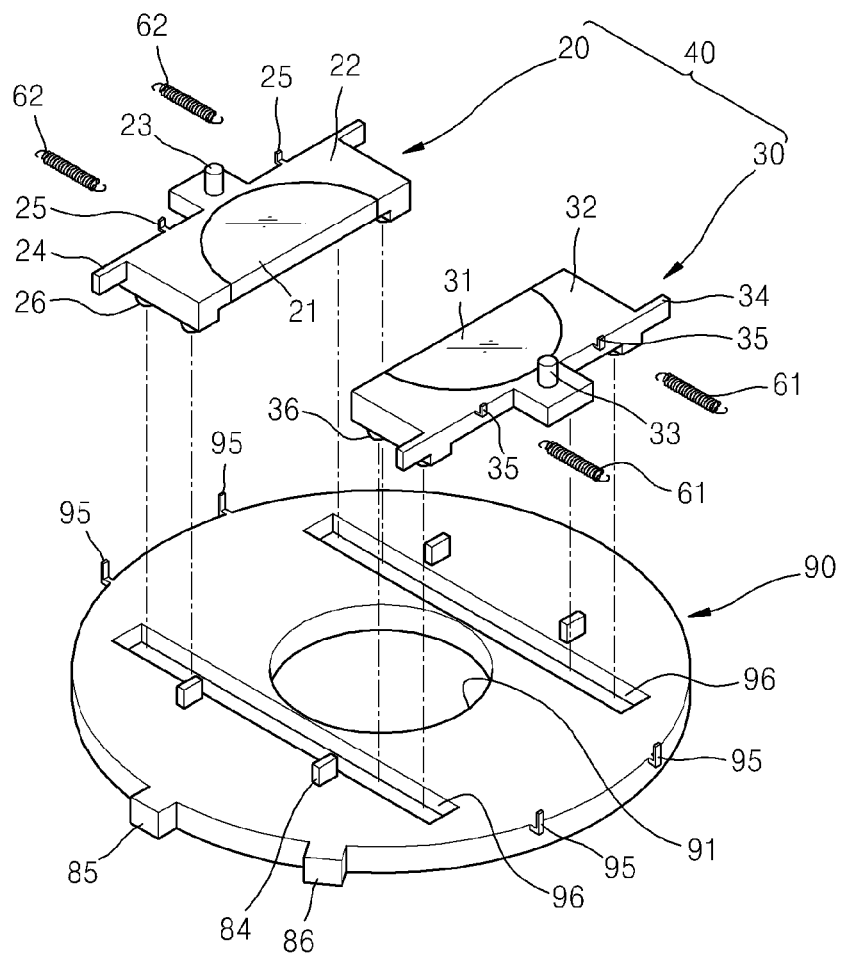

LIGHT PATH ADJUSTMENT APPARATUS AND PHOTOGRAPHING APPARATUS INCLUDING THE SAME

CROSS-REFERENCE TO RELATED PATENT APPLICATION

This application claims the priority benefit of Korean Patent Application No. 10-2010-0096519, filed on Oct. 4, 2010, in the Korean Intellectual Property Office, the entire disclosure of which is incorporated herein by reference.

BACKGROUND

1. Field of the Invention

Embodiments relate to a light path adjustment apparatus and a digital photographing apparatus including the same, and more particularly, to a photographing apparatus capable of selectively capturing a 3D image or a 2D image and a light path adjustment apparatus used for the same.

2. Description of the Related Art

A 3D image provides a stereoscopic effect for a subject when observed by human vision. Although 3D images were only used for medical equipment, video is often produced using 3D images, and 3D TV technology is rapidly developing.

To provide a 3D image, images captured at different angles according to human eyes are simultaneously provided, and thus an apparatus for capturing a 3D image has a different operating structure from an apparatus for capturing a 2D image. Various types of apparatuses are used to capture a 3D image. However, since images viewed at different angles are simultaneously obtained, an optical structure or a mechanical structure of the apparatus for capturing a 3D image is more complicated than that of the apparatus for capturing a 2D image. Further, since a 2D image cannot be obtained by using the apparatus for capturing a 3D image, an additional camera is necessary for capturing a 2D image.

SUMMARY

Embodiments can provide a photographing apparatus capable of selectively capturing a 3D image or a 2D image and a light path adjustment apparatus used for the same.

Embodiments can provide a light path adjustment apparatus capable of capturing a 3D image through a simple structure and a photographing apparatus including the same.

Embodiments can provide a light path adjustment apparatus capable of obtaining a sufficient quantity of light when a 2D image is captured and a photographing apparatus including the same.

Embodiments can provide a light path adjustment apparatus capable of achieving low noise and low power consumption and for capturing a 3D moving image and a photographing apparatus including the same.

According to an embodiment, there is provided a light path adjustment apparatus includes a support plate that has a first through hole through which light passes and optical units that move between an open location where the first through hole is opened by the optical units moving toward an outside of the first through hole and a closing location where the first through hole is divided into a plurality of regions by the plurality of optical units moving toward the first through hole. The optical units block at least a part of the light in the closing location.

The optical units may include an optical filter that passes light within different optical ranges.

The optical units may include a liquid crystal device that operates according to an externally applied signal and passes or blocks the light. The liquid crystal device may pass the light according to a time difference.

The light path adjustment apparatus may further includes a rotation plate comprising a second through hole corresponding to the first through hole and rotatable with respect to the support plate. The optical units may include a first optical unit corresponding to a first region of the first through hole, and a second optical unit corresponding to a second region of the first through hole. The first optical unit and the second optical unit may be mated to the support plate and the rotation plate, respectively, and may move between a 2D photographing location and a 3D photographing location when the rotation plate rotates.

The first optical unit and the second optical unit may be rotatably mated to the support plate.

The first optical unit and the second optical unit may be mated to the support plate by a rectilinear guide to perform a rectilinear motion.

The first optical unit and the second optical unit may each include a projection portion, and the rotation plate may include a groove portion into which at least one of the projection portion of the first optical unit and the projection portion of the second optical unit is inserted.

The rotation plate may include at least two projection portions, and each of the first optical unit and the second optical unit may include a groove portion into which at least one of the at least two projection portions is inserted.

The light path adjustment apparatus may further include a first detection unit that detects a relative location of the rotation plate with respect to the support plate.

The light path adjustment apparatus may further includes a second detection unit that detects relative locations of the plurality of optical units with respect to the support plate.

The light path adjustment apparatus may further include an elastic member that elastically biases at least one of the optical units toward the first through hole or toward the outside of the first through hole.

Each of the optical units may include a first optical unit corresponding to a first region of the first through hole and a second optical unit corresponding to a second region of the first through hole. Each of the first optical unit and the second optical unit may include a coupling pin. The support plate may include a guide groove outwardly extending from the first through hole and mated to at least one of coupling pin of the first optical unit and the coupling pin of the second optical unit so as to guide a movement of the coupling pin. The light path adjustment apparatus may further include cam plates mated to the support plate to move in a direction crossing the extension direction of the guide groove and may include cam grooves extending at an incline with respect to the guide groove.

The optical units may include a first optical unit corresponding to a first region of the first through hole, a second optical unit corresponding to a second region of the first through hole, and a hinge unit having a first end rotatably mated to the first optical unit and a second end rotatably mated to the second optical unit. The first optical unit may be mated to the support plate to perform a rectilinear motion by a rectilinear guide, and the second optical unit may include a sliding guide slidably supporting the second end of the hinge unit so that the second optical unit slidably moves toward the first optical unit.

The optical units may be disposed in such a way that neighboring boundary surfaces of the optical units partially overlap when the optical units are in the closing location.

The light path adjustment apparatus may further include a shading plate disposed on a surface of one side of one optical unit to cover neighboring boundary surfaces of at least another optical unit when the optical units are in the closing location.

The light path adjustment apparatus may further include a shading plate disposed in a side surface of one optical unit to contact other side surfaces of neighboring optical units when the optical units are in the closing location.

According to another embodiment, there is provided a photographing apparatus. The photographing apparatus includes a light path adjustment apparatus, an imaging device that converts light that passes through the light path adjustment apparatus into an electrical signal, and a control unit. The light path adjustment apparatus includes a support plate that has a first through hole through which light passes and optical units that move between an open location where the first through hole is opened by the optical units moving toward an outside of the first through hole and a closing location where the first through hole is divided into regions by the optical units moving toward the first through hole. The optical units block at least a part of the light in the closing location. The control unit performs photographing by controlling the imaging device and selects a 2D photographing mode in which, when the optical units are disposed in the open location, a single image incident through the first through hole is obtained, or a 3D photographing mode in which, when the optical units are disposed in the closing location, a plurality of images incident through the plurality of optical units are obtained.

At least one of the optical units may include optical filters that pass light within different optical ranges, and light dividing filters disposed in front of the imaging device that divide light incident through the optical units.

At least one of the optical units may include a liquid crystal device that operates according to time differences by an externally applied signal and that passes or blocks light, and the control unit may obtain images by controlling the imaging device in connection with time taken to operate the liquid crystal device.

The photographing apparatus may further include a driving unit that moves the optical units, wherein the control unit controls the driving unit and selects the 2D photographing mode or the 3D photographing mode.

BRIEF DESCRIPTION OF THE DRAWINGS

The above and other features and advantages will become more apparent by describing in detail exemplary embodiments with reference to the attached drawings in which:

FIG. 2 is an exploded view of the light path adjustment apparatus of FIG. 1;

DETAILED DESCRIPTION

Embodiments will now be described more fully with reference to the accompanying drawings, in which exemplary embodiments are shown.

Figure 1:
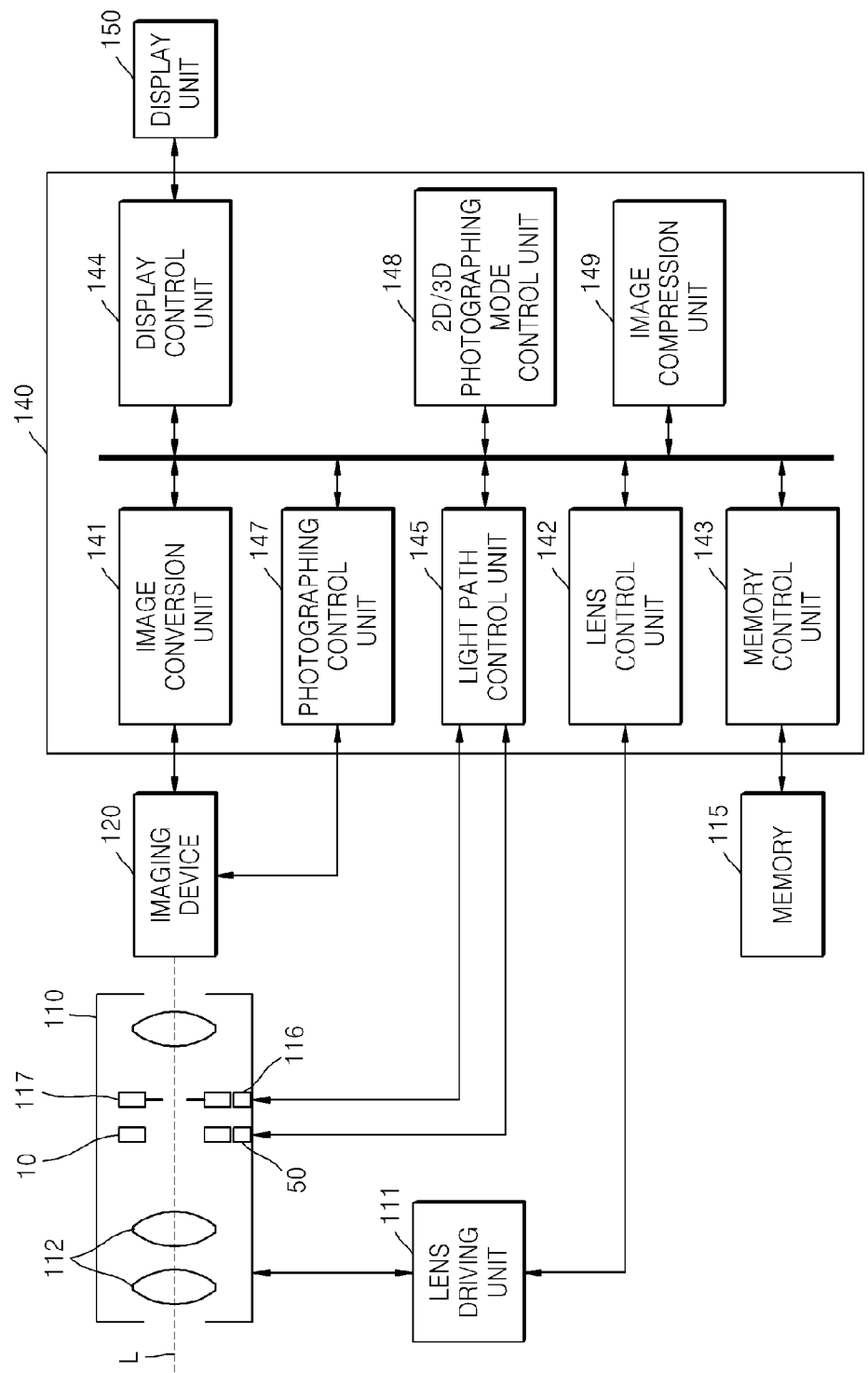
FIG. 1 is a block diagram of a photographing apparatus including a light path adjustment apparatus according to an embodiment.

FIG. 1 is a block diagram of a photographing apparatus that can include a light path adjustment apparatus 10 according to an embodiment. Referring to FIG. 1, the photographing apparatus of the present embodiment can include the light path adjustment apparatus 10, an imaging device 120 that can convert light that passes through the light path adjustment apparatus 10 into an electrical signal, and a control unit 140. The control unit 140 can control the imaging device 120, can select a 2D photographing mode or a 3D photographing mode, and can execute the selected photographing mode.

The light path adjustment apparatus 10 may be disposed on a path of light that passes through lenses 112 and is incident on the imaging device 120. The light adjustment apparatus 10 can completely open the path of the light or can close at least a part of the path of the light, thereby blocking at least a part of the light. The imaging device 120 can be used to capture a 2D image or a 3D image in connection with the operation of the light path adjustment apparatus 10.

The photographing apparatus of the present embodiment may be realized in various ways. For example, the photographing apparatus may be a digital still camera that can capture a still image and a digital video camera that can capture a moving image.

The imaging device 120 can capture an image of a subject and can convert the image into an electrical signal. The electrical signal can be converted into image data by an image conversion unit 141. A photographing control unit 147 of the control unit 140 can control the imaging device 120 to perform a photographing operation.

The lenses 112 can form an optical system. The lenses 112 can be installed in a body tube 110 and can be disposed in front of the imaging device 120 and the light path adjustment apparatus 10. The lenses 112 can form an image on an imaging surface of the imaging device 120.

The lenses 112 can be disposed having variable spaces therebetween. If the spaces between the lenses 112 vary, a zooming magnification or a focus may be adjusted. The lenses 112 can be disposed along an optical axis L, that is, a rectilinear line connecting optical centers of the lenses 112.

The lenses 112 can be driven by a lens driving unit 111 including a driving member such as a zoom motor (not shown) so that locations of the lenses 112 can vary. The lenses 112 may include a zoom lens that can magnify or reduce a size of a subject and a focus lens that can adjust a focus of the subject.

The imaging device 120 can include a photoelectric conversion device such as a charge coupled device (CCD) or a complementary metal oxide semiconductor (CMOS). The imaging device 120 can convert image light passing through the lenses 112 and the light path adjustment apparatus 10 and incident on the imaging device 120 into an electrical signal. The imaging device 120 can be driven by a control signal applied from the photographing control unit 147.

The image conversion unit 141 can convert an electrical signal of the imaging device 120 into image data. Image processing may be performed on the image data or the image data may be stored in a memory 115. For example, the image conversion unit 141 may convert the electrical signal of the imaging device 120 into RGB data and may convert the RGB data into raw data in the form of a YUV signal including a luminance signal Y and a chroma signal UV.

A process that can convert an electrical signal of the imaging device 120 in the image conversion unit 141 may include, for example, reducing driving noise of the imaging device 120 included in the electrical signal by using a correlation double sampling (CDS) circuit, adjusting a gain of the electrical signal from which noise is reduced by using an automatic gain control (AGC) circuit, converting an analog signal into a digital signal by using an analog/digital (A/D) converter, and performing signal processing on the digital signal, such as pixel defect correction, gain correction, white balance correction, and gamma correction. The CDS circuit, the AGC circuit, and the A/D converter may be realized as separate circuits.

The control unit 140 can be electrically connected to the imaging device 120, the lens driving unit 111, a display unit 150, the light path adjustment apparatus 10, and the memory 115. The control unit 140 can communicate a control signal with the above elements to control operations of the elements or processes data.

The control unit 140 can include the image conversion unit 141, a lens control unit 142, a memory control unit 143, a display control unit 144, a light path control unit 145, the photographing control unit 147, a 2D/3D photographing mode control unit 148, and an image compression unit 149.

The control unit 140 may be realized as a micro chip or a circuit board including a micro chip. The above elements included in the control unit 140 may be realized as software or circuits embedded in the control unit 140.

The memory control unit 143 can control recording of data in the memory 115 and reading of recorded data or setting information.

The memory 115 may be an embedded volatile memory, and, for example, a semiconductor storage device such as SDRAM. The memory 115 may perform a buffer memory function of temporarily storing image data generated by the imaging conversion unit 141 and a data processing job memory function.

The memory 115 may be a nonvolatile portable memory, for example, a flash memory such as an SD/MMC, a storage device such as an HDD, or an optical storage device such as a DVD or a CD. In this case, the memory 115 may store image data that can be compressed and converted into the form of a JPEG file, a TIF file, a GIF file, a PCX file, or the like by the image compression unit 149.

The photographing apparatus of the present embodiment may include the display unit 150 that can display an image of image data. For example, the display unit 150 may be a touch screen that can detect a touch on a surface thereof and generating a signal corresponding to the detected touch on a display device such as an LCD or an OLED.

The 2D/3D photographing mode control unit 148 can set one of a 2D photographing mode, in which a 2D image can be captured, and a 3D photographing mode, in which a 3D image can be captured, as a photographing mode of the photographing apparatus. Operations of the light path control unit 145 and the photographing control unit 147 may change according to the set photographing mode.

An iris 117 and an iris driving unit 116, that can adjust a quantity of light, are installed on the path of light. The iris driving unit 116 can operate according to a control signal applied from the light path control unit 145 and can drive the iris 117.

Figure 3:
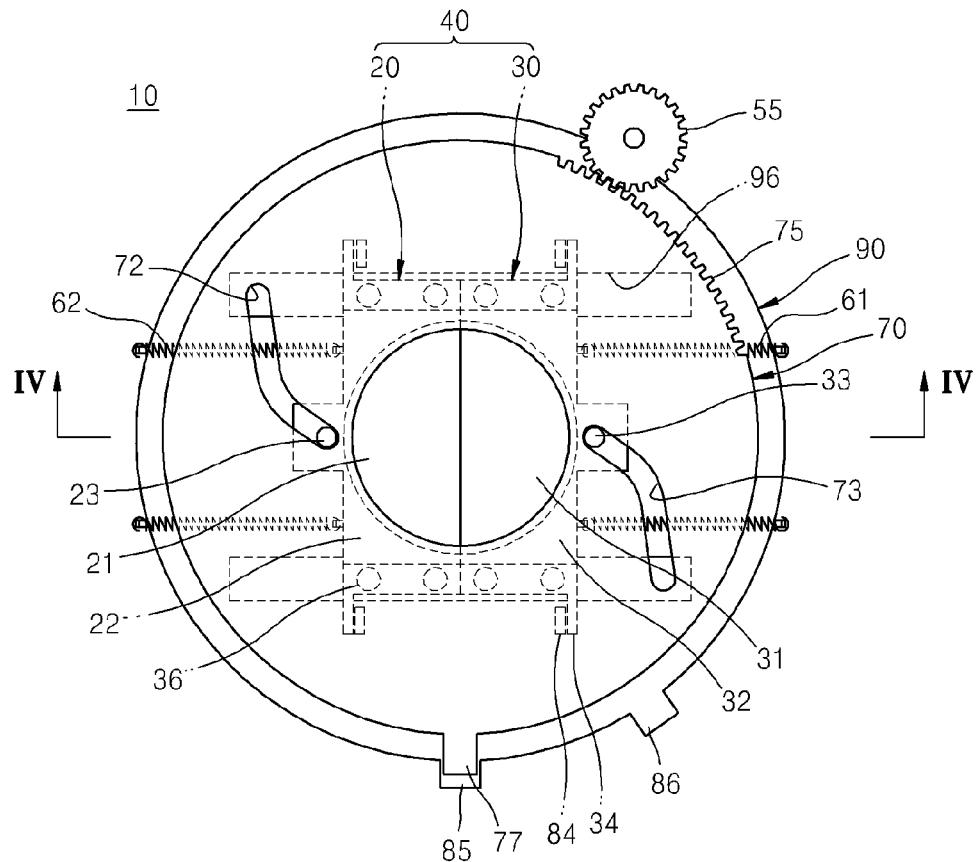
FIG. 3 is a plan view of the light path adjustment apparatus of FIG. 2 in a coupling state.

FIG. 2 is an exploded view of the light path adjustment apparatus 10 of FIG. 1. FIG. 3 is a plan view of the light path adjustment apparatus 10 of FIG. 2 in a coupling state.

Referring to FIGS. 2 and 3, the light path adjustment apparatus 10 can include a support plate 90 and a plurality of optical units 40. The support plate 90 can include a first through hole 91 through which light passes, and the plurality of optical units 40 can be movably disposed and can open or close the first through hole 91.

The first through hole 91 can guide light passed through the lenses 112 of FIG. 1 to form an image on the imaging device 120. The optical units 40 may move away from the first through hole 91 so as to open the first through hole 91. For example, the optical units 40 may move towards an outside of the first through hole 91. Further, the optical units 40 may move toward the first through hole 91 so as to close the first through hole 91. The optical units 40 can be disposed to move between a position where the first through hole 91 is opened and a position where the first through hole 91 is closed.

The optical units 40 can include a first optical unit 20 corresponding to a first region that is a partial region of the first through hole 91, and a second optical unit 30 corresponding to a second region that is a remaining region thereof. When the optical units 40 are in the position where the first through hole 91 is closed, the first optical unit 20 can close the first region of the first through hole 91, and the second optical unit 30 can close the second region thereof. In this case, the first optical unit 20 and the second optical unit 30 may divide the first through hole 91 into two regions and may close the first through hole 91.

Embodiments are not limited to two optical units 40, and the optical units 40 may include three or more optical units. In this case, when the optical units 40 are in the position where the first through hole 91 is closed, the optical units 40 may divide the first through hole 91 into three or more regions and close the first through hole 91.

The first optical unit 20 and the second optical unit 30 can include optical elements 21 and 31, respectively, and support frames 22 and 32 that support the optical elements 21 and 31, respectively. The support frames 22 and 32 can be coupled to the support plate 90 by a rectilinear guide to perform a rectilinear motion.

The rectilinear guide can include two rectilinear guide grooves 96 formed in the support plate 90 and rectilinear motion bearings 26 and 36 formed in the support frames 22 and 32, respectively. The rectilinear motion bearings 26 and 36 can be slidably coupled to the rectilinear guide grooves 96, and thus the first optical unit 20 and the second optical unit 30 may perform the rectilinear motion relative to a surface of the support plate 90.

Although the rectilinear guide can include the rectilinear guide grooves 96 formed in the support plate 90 and the rectilinear motion bearings 26 and 36 formed in the support frames 22 and 32, embodiments are not limited thereto, and various types of modifications may be implemented. For example, the rectilinear guide may include rectilinear motion bearings formed in the support plate 90 and rectilinear guide grooves formed in the support frames 22 and 32.

The light path adjustment apparatus 10 can include a rotation plate 70 as a driving means for driving the rectilinear motion of the first optical unit 20 and the second optical unit 30. The rotation plate 70 can include a second through hole 71 corresponding to the first through hole 91 and can be rotatable relative to the support plate 90 with respect to the first through hole 91.

The first optical unit 20 and the second optical unit 30 can include projections 23 and 33, respectively, that may project toward the rotation plate 70. Groove portions 72 and 73 into which the projections 23 and 33 can be inserted, respectively, can be formed in the rotation plate 70. The groove portions 72 and 73 can extend curved in a radial direction and can transfer a rotational force of the rotation plate 70 to the projections 23 and 33. Thus, the rotational force of the rotation plate 70 can be transferred to the projections 23 and 33 so that the first optical unit 20 and the second optical unit 30 can perform the rectilinear motion along the rectilinear guide grooves 96.

Embodiments are not limited to the projections 23 and 33 and the groove portions 72 and 73 used to transfer the rotational force of the rotation plate 70 and drive the first optical unit 20 and the second optical unit 30. Various types of modifications may be implemented. For example, projections may be formed in the rotation plate 70, and groove portions into which the projections are inserted may extend and be formed in the first optical unit 20 and the second optical unit 30.

The light path adjustment apparatus 10 can include a driving motor 50 as a driving means for rotating the rotation plate 70, a driving gear 55 that can rotate with respect to an axis of the driving motor 50, and a gear surface 75 that can be formed in an outer circumferential surface of the rotation plate 70. However, embodiments are not limited to the driving means, and various types of modifications may be implemented. For example, a rectilinear motion cylinder that can operate by a solenoid valve or a pneumatic valve may be connected to the rotation plate 70 so as to rotate the rotation plate 70 within a predetermined angle range to drive the rectilinear motion of the first optical unit 20 and the second optical unit 30.

The driving motor 50, as shown in FIG. 1, can receive a control signal from the light path control unit 145 of the control unit 140 of the photographing apparatus to operate. A driving force of the driving motor 50 can be transferred to the first optical unit 20 and the second optical unit 30 through the rotation plate 70 and the projections 23 and 33.

The light path adjustment apparatus 10 may include one or more first detection units 85 and 86 that can detect a relative rotation location of the rotation plate 70 with respect to the support plate 90. The first detection units 85 and 86 can be located corresponding to a projection plate 77 that can project from an outside portion of the rotation plate 70, so that the first detection units 85 and 86 can detect whether the rotation plate 70 is located corresponding to opening locations of the first optical unit 20 and the second optical unit 30 or closing locations thereof. The first detection units 85 and 86 may be realized as, for example, an optical detection sensor.

The light path adjustment apparatus 10 can also include a second detection unit 84 that can detect relative locations of the first optical unit 20 and the second optical unit 30 with respect to the support plate 90. The first optical unit 20 and the second optical unit 30 can include contact units 24 and 34, respectively, that can outwardly project to contact the second detection unit 84. The second detection unit 84 may be realized as, for example, a contact switch that can be switched on or off according to contact.

As described above, the first detection units 85 and 86 or the second detection unit 84 may easily detect a location of the rotation plate 70 or the optical units 40 and control driving of the rotation plate 70 or the optical units 40 without installing complicated wiring.

The light path adjustment apparatus 10 may include elastic members 61 and 62 that can bias the first optical unit 20 and the second optical unit 30 toward the outside of the first through hole 91, i.e., toward the opening locations of the first optical unit 20 and the second optical unit 30. Although the elastic members 61 and 62 are realized as compressive coil springs, embodiments are not limited thereto, and a different type of mechanical element, such as a pneumatic cylinder, a rubber string, etc., may be used.

Ends of the elastic members 61 and 62 can be connected to support portions 25 and 35 that can project from the first optical unit 20 and the second optical unit 30, respectively. Other ends of elastic members 61 and 62 can be connected to a support portion 95 that can be formed on an outside portion of the support plate 90. Thus, elastic forces of the elastic members 61 and 62 can pull the first optical unit 20 and the second optical unit 30 toward the support portion 95, so that the first optical unit 20 and the second optical unit 30 may be elastically biased toward their opening locations.

Figure 4:
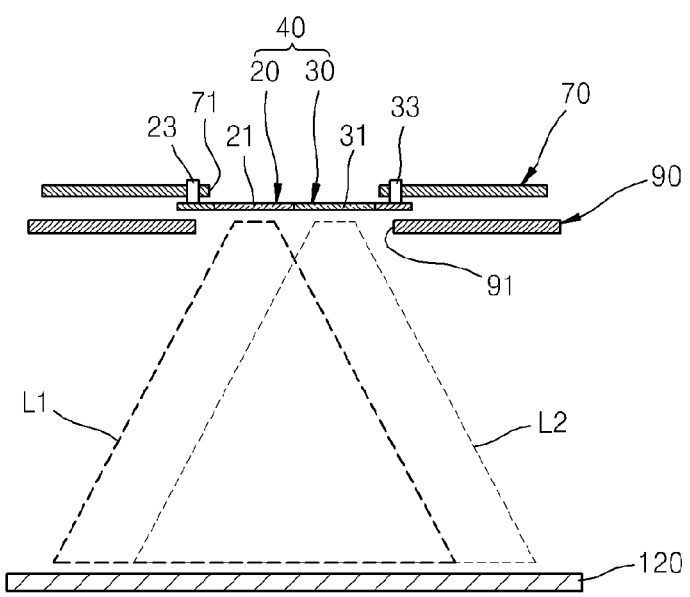
FIG. 4 is a conceptual diagram for explaining an operation of performing 3D photographing by using the light path adjustment apparatus of FIG. 2.

FIG. 4 is a conceptual diagram for explaining an operation of performing 3D photographing by using the light path adjustment apparatus 10 of FIG. 2.

Referring to FIG. 4, the optical elements 21 and 31 of the first optical unit 20 and the second optical unit 30 may be liquid crystal devices that can pass or block light according to an externally applied signal. A liquid crystal device can use a change in a refractive index of liquid crystals according to changes in orientations of the liquid crystal when an electric field is applied to the liquid crystals. The optical elements 21 and 31 may receive the control signal from the light path control unit 145 of FIG. 1 and pass or not pass light.

Light L1 can pass through the optical element 21 of the first optical unit 20. Light L2 can pass through the optical element 31 of the second optical unit 30. FIG. 4 shows the 3D photographing mode in which a 3D image is captured by using the imaging device 120.

To capture a 3D image, the first optical unit 20 and the second optical unit 30 can operate according to a time difference and alternately pass light. The imaging device 120 can operate in connection with the alternate passing of light of the first optical unit 20 and the second optical unit 30. Thus, a first image can be obtained by capturing left light L1 that passes through the first optical unit 20, and a second image can be obtained by capturing right light L2 that passes through the second optical unit 30.

In the 3D photographing mode, the first optical unit 20 or the second optical unit 30 can operate to block light. That is, when the optical units 40 are in their closing locations to capture a 3D image, one of the optical units 40 can operate to block at least a part of light that passes therethrough.

Figure 5:
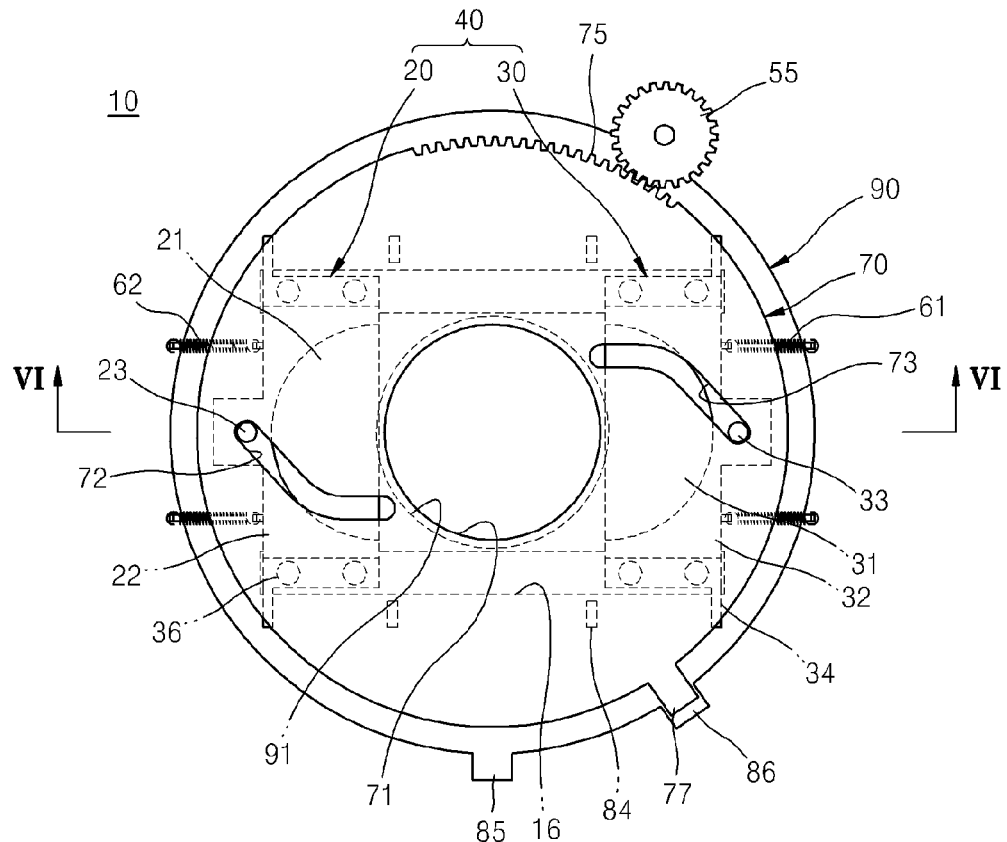
FIG. 5 is a plan view of an optical unit of the light path adjustment apparatus of FIG. 3 in an open state.
Figure 6:
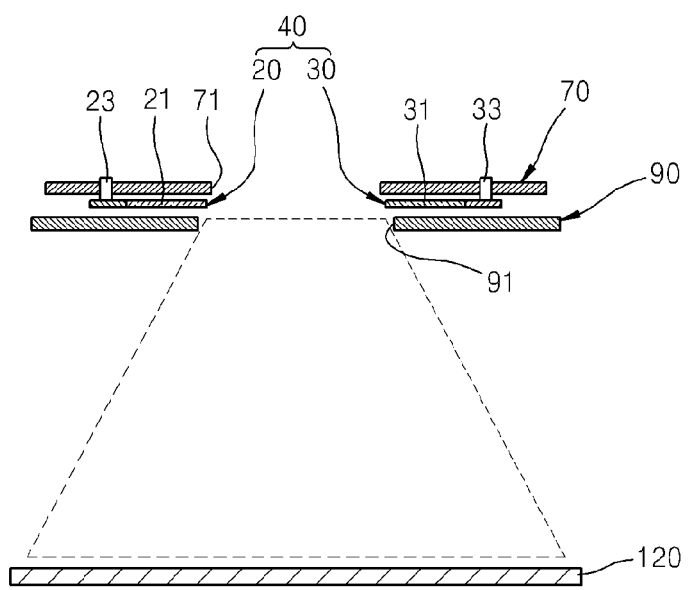
FIG. 6 is a conceptual diagram for explaining an operation of performing 2D photographing by using the light path adjustment apparatus of FIG. 5.

FIG. 5 is a plan view of the optical units 40 of the light path adjustment apparatus 10 of FIG. 3 in an open state. FIG. 6 is a conceptual diagram for explaining an operation of performing 2D photographing by using the light path adjustment apparatus 10 of FIG. 5.

Referring to FIGS. 5 and 6, the optical units 40 can move away from the first through hole 91 and can be in an open state, which corresponds to the 2D photographing mode in which the imaging device 120 can be controlled to obtain a 2D image through the first through hole 91.

To generally obtain a 3D image, an optical element for dividing a light path may be disposed on the light path. However, if a 2D image is captured by using a photographing device for capturing a 3D image, an optical element that can be disposed on a light path can reduce a quantity of light that is introduced into an imaging device. Thus, a 2D image captured in a 2D photographing mode may have insufficient exposure.

The photographing apparatus including the light path adjustment apparatus 10 of FIGS. 1 through 6 can enable the optical units 40 to move between their opening locations and their closing locations, thereby obtaining a sufficient quantity of light in the 2D photographing mode of FIGS. 5 and 6.

The first optical unit 20 and the second optical unit 30 can operate in engagement with the rotation plate 70, which can rotate with respect to the support plate 90. The first optical unit 20 and the second optical unit 30 may easily move the optical units 40 used in the 3D photographing mode to the position where the first through hole 91 is opened or to the position where the first through hole 91 is closed while using a compact construction.

Figure 7:
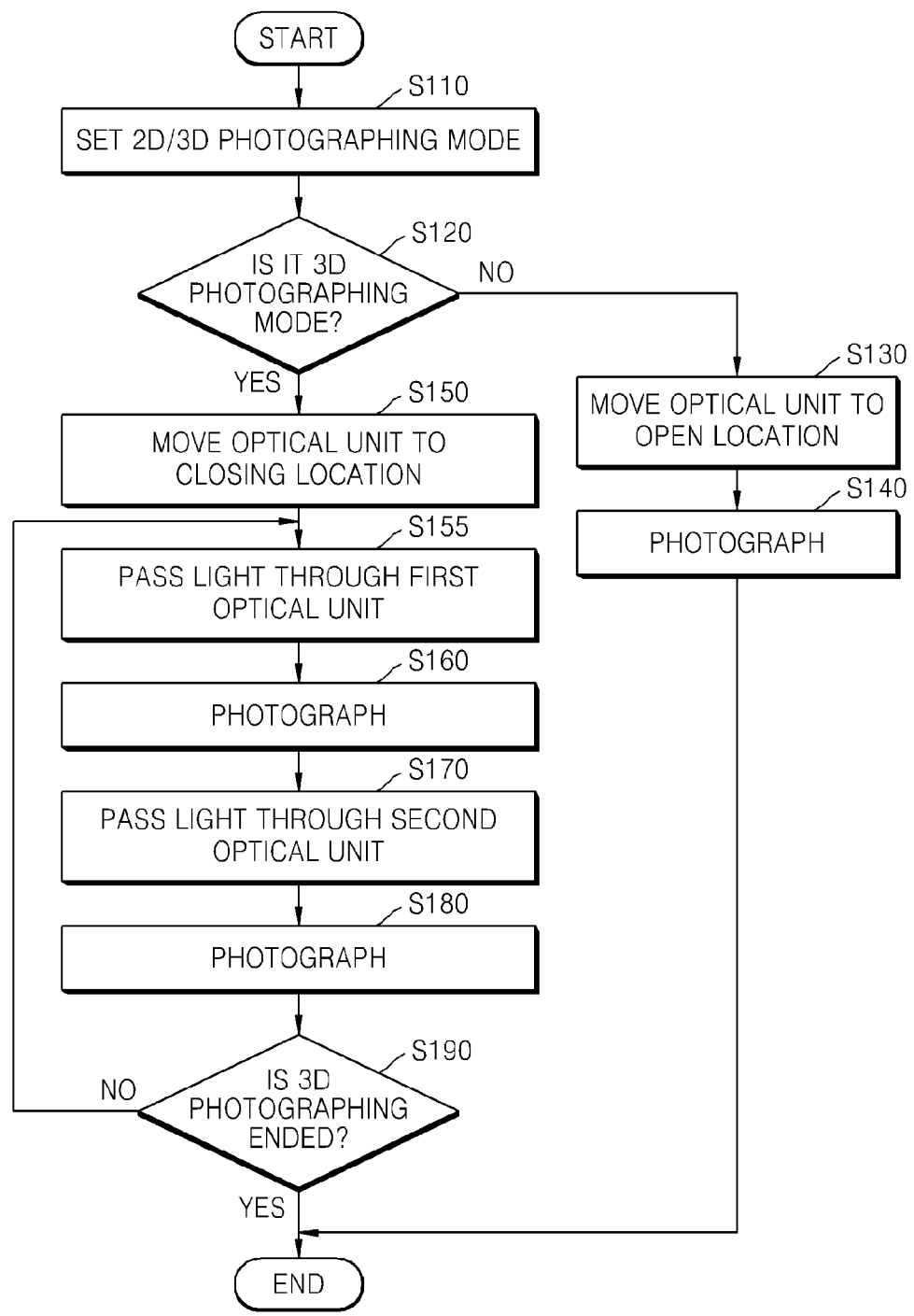
FIG. 7 is a flowchart of photographing operations performed by the photographing apparatus of FIG. 1.

FIG. 7 is a flowchart of photographing operations performed by the photographing apparatus of FIG. 1. The 2D photographing mode or the 3D photographing mode can be selectively performed according to the photographing operations performed by the photographing apparatus.

Referring to FIG. 7, in operation 110, a 2D/3D photographing mode setting operation of presetting whether to perform the 2D photographing mode or the 3D photographing mode can be performed. If a photographing shutter is manipulated, in operation 120, it can be determined whether the 3D photographing mode is set in operation 110.

If it is determined that the 2D photographing mode is set, in operation 130, the optical units 40 can move to their opening locations as shown FIG. 5 and the first through hole 91 can be opened. In operation 140, an opening area of the iris 117 can be adjusted, and a 2D image can be captured. The opening area of the iris 117 can be determined according to a brightness of a subject that is to be captured.

If it is determined that the 3D photographing mode is set, in operation 150, the optical units 40 can move to their closing locations as shown in FIG. 3 and the first through hole 91 can be closed. Thereafter, in operation 155, the optical units 40 can operate to pass light through only the first optical unit 20. In operation 160, a first image can be captured by using the light that passes through the first optical unit 20. Thereafter, in operation 170, the optical units 40 can operate to pass light through only the second optical unit 30. In operation 180, a second image can be captured by using the light that passes through the second optical unit 30.

Embodiments are not limited to this sequence of blocking light by the first optical unit 20 and the second optical unit 30. For example, the first optical unit 20 may block light after the second optical unit 30 has blocked light by modifying the operations described above.

In operation 190, it can be determined whether the 3D photographing mode ends. If it is determined that the 3D photographing mode is to continue to be executed, 3D photographing may be continued by repeating operations 155 through 180. Such repeating of the 3D photographing may be applied to capturing both a still image and a motion image.

The first image and the second image obtained by operating the optical units 40 may be used to realize a 3D image.

Figure 8:
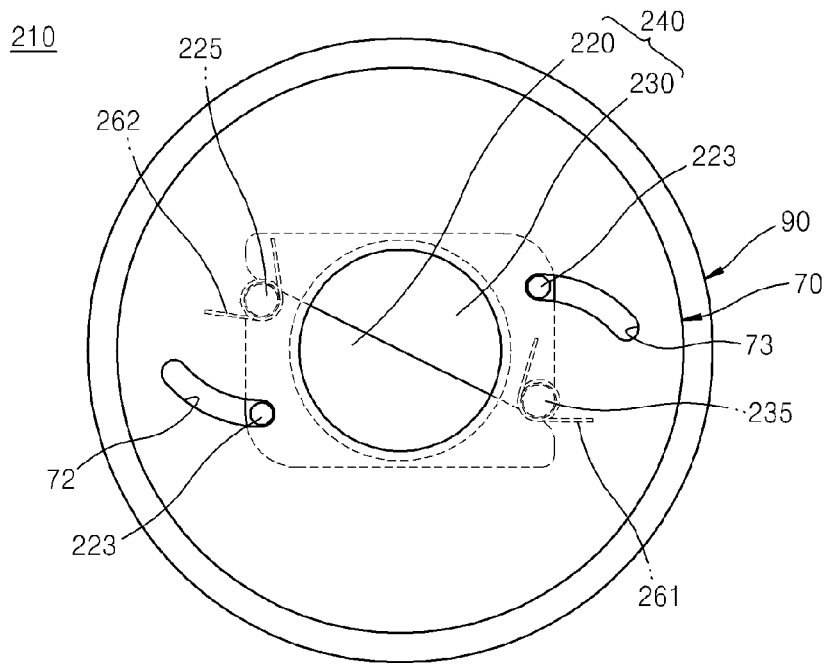
FIG. 8 is a plan view of a light path adjustment apparatus according to another embodiment.
Figure 9:
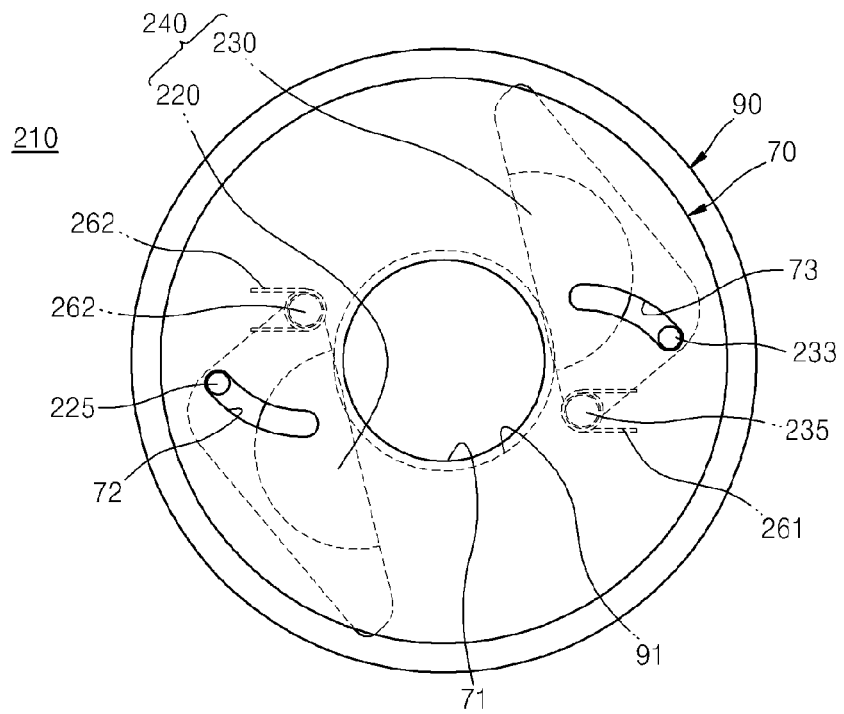
FIG. 9 is a plan view of optical units of the light path adjustment apparatus of FIG. 8 in an open state.

FIG. 8 is a plan view of a light path adjustment apparatus 210 according to another embodiment. FIG. 9 is a plan view of optical units of the light path adjustment apparatus 210 of FIG. 8 in an open state.

The light path adjustment apparatus 210 of the present embodiment can include the support plate 90 that can include the first through hole 91 through which light passes, a plurality of optical units 240 that can be movably disposed and that can open or close the first through hole 91, and the rotation plate 70 that can be rotatably disposed with respect to the support plate 90 and that can move the optical units 240. The light path adjustment apparatus 210 can be similar to the light path adjustment apparatus 10 described with reference to FIGS. 2 through 6.

Although the optical units 40 can operate in engagement with the rotation plate 70 to perform a rectilinear motion in the previous embodiment described with reference to FIGS. 2 through 6, the optical units 240 can operate in engagement with the rotation plate 70 to perform a rotational motion in the present embodiment described with reference to FIGS. 8 and 9. Referring to FIG. 8, the optical units 240 can be in a closing location where the first through hole 91 is closed. Referring to FIG. 9, the optical units 240 can be in an opening location where the first through hole 91 is opened.

The optical units 240 can include a first optical unit 220 that can be rotatably coupled to the support plate 90 with respect to a hinge axis 225, and a second optical unit 230 that can be rotatably coupled to the support plate 90 with respect to a hinge axis 235. The first optical unit 220 and the second optical unit 230 can include projection units 223 and 233, respectively. The rotation plate 70 can include groove portions 72 and 73 into which the projections 223 and 233 can be inserted.

A rotational force of the rotation plate 70 can be transferred to the projections 223 and 233 through the groove portions 72 and 73 of the rotation plate 70 so that the first optical unit 220 and the second optical unit 230 can rotate with respect to the support plate 90 and can move to the opening location as shown in FIG. 9.

The first optical unit 220 and the second optical unit 230 can be elastically supported by elastic members 261 and 262 in the hinge axes 225 and 235, respectively, with respect to the support plate 90. That is, the first optical unit 220 and the second optical unit 230 can be elastically biased by the elastic members 261 and 262, respectively, toward the closing location as shown in FIG. 8. Thus, if a driving force transferred to the rotation plate 70 is released, elastic forces of the elastic members 261 and 262 can enable the first optical unit 220 and the second optical unit 230 to rotate toward the closing location.

Although not shown in FIG. 8, the driving motor 50 of FIG. 2 may be used as a driving means for rotating the rotation plate 70.

Figure 10:
FIG. 10 is a plan view of a part of a light path adjustment apparatus according to another embodiment.
Figure 11:
FIG. 11 is a plan view of optical units of the light path adjustment apparatus of FIG. 10 in a closed state.

FIG. 10 is a plan view of a part of a light path adjustment apparatus according to another embodiment. FIG. 11 is a plan view of optical units of the light path adjustment apparatus of FIG. 10 in a closed state.

Referring to FIG. 10, a first through hole is in an open state where a first optical unit 320 and a second optical unit 330 of the light path adjustment apparatus can move away from the first through hole. For example, the first optical unit 320 and the second optical unit 330 may move towards an outside of the first through hole. The first optical unit 320 of the light path adjustment apparatus can further include a shading plate 339 disposed on one side surface of a boundary facing toward the second optical unit 330.

Referring to FIG. 11, if the first optical unit 320 and the second optical unit 330 move toward each other and block the first through hole, the shading plate 339 can cover a boundary surface between the first optical unit 320 and the second optical unit 330, thereby effectively preventing light from leaking between the first optical unit 320 and the second optical unit 330.

Further, a center of a first image obtained by using light incident through the first optical unit 320 and a center of a second image obtained by using light incident through the second optical unit 330 can be sufficiently spaced apart from each other by the shading plate 339, thereby obtaining a good quality 3D image.

Figure 12:
FIG. 12 is a plan view of a part of a light path adjustment apparatus according to another embodiment.
Figure 13:
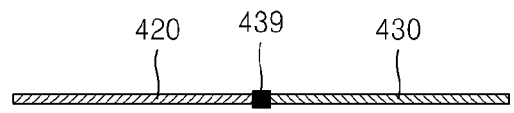
FIG. 13 is a plan view of optical units of the light path adjustment apparatus of FIG. 12 in a closed state.

FIG. 12 is a plan view of a part of a light path adjustment apparatus according to another embodiment. FIG. 13 is a plan view of optical units of the light path adjustment apparatus of FIG. 12 in a closed state.

The light path adjustment apparatus of the present embodiment is similar to the light path adjustment apparatus of the previous embodiment described with respect to FIGS. 10 and 11, but is different in that an arrangement location of a shading plate 439 is modified. The shading plate 439 can be disposed in a side surface of a second optical unit 430 facing toward a first optical unit 420. Thus, the shading plate 439 coupled to the second optical unit 430 can contact a side surface of the first optical unit 420 neighboring the second optical unit 430 when the first optical unit 420 and the second optical unit 430 are in a closing location, thereby preventing light from leaking between a boundary surfaces between the first optical unit 420 and the second optical unit 430.

Further, a width of the shading plate 439 can be adjusted such that optical centers of the first optical unit 420 and the second optical unit 430 can be sufficiently spaced apart from each other, thereby obtaining a good quality 3D image.

The shading plate 439 may also absorb a shock that occurs when the first optical unit 420 and the second optical unit 430 move from an open location to the closing location. To this end, the shading plate 439 may be formed of a material such as rubber or soft synthetic resin.

Figure 14:
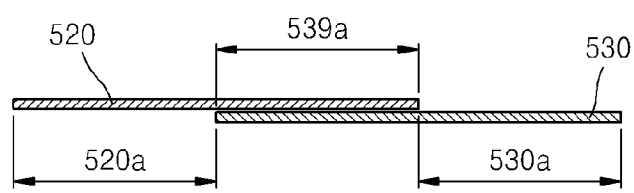
FIG. 14 is a front view of a part of a light path adjustment apparatus according to another embodiment.

FIG. 14 is a front view of a part of a light path adjustment apparatus according to another embodiment. Referring to FIG. 14, the light path adjustment apparatus may prevent light from leaking between boundary surfaces between a first optical unit 520 and a second optical unit 530 without a coupling element therebetween and may overlap a part 539a of the boundary surfaces between the first optical unit 520 and the second optical unit 530 in a closing location. Thus, a first image can be obtained by using light that passes through a passage region 520a of the first optical unit 520, and a second image can be obtained by using light that passes through a passage region 530a of the second optical unit 530. The part 539a where the first optical unit 520 and the second optical unit 530 overlap may prevent light from leaking therethrough.

Figure 15:
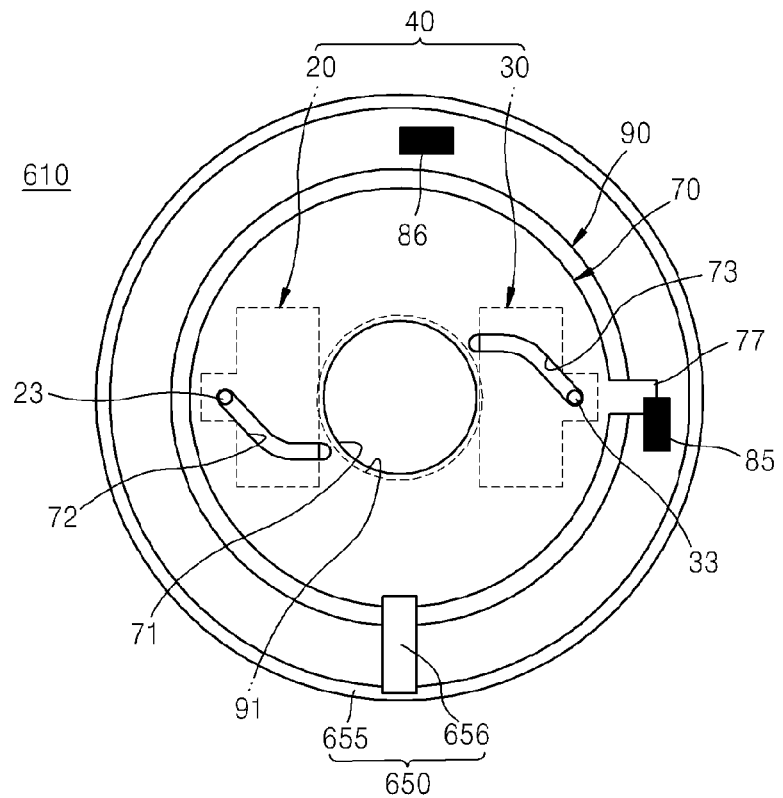
FIG. 15 is a plan view of a light path adjustment apparatus according to another embodiment.

FIG. 15 is a plan view of a light path adjustment apparatus 610 according to another embodiment. The light path adjustment apparatus 610 is similar to the light path adjustment apparatus of FIG. 5. In FIG. 5, a driving motor and a driving gear can be used to rotate the rotation plate 70, whereas in FIG. 15, a manual driving unit 650 can be coupled to the rotation plate 70 to manually operate the rotation plate 70. The manual driving unit 650 can include a connection plate 656 coupled to an external edge of the rotation plate 70 and a rotation cylinder 655 connected to the connection plate 656 and rotatably coupled to an outside portion of the rotation plate 70.

For example, when the light path adjustment apparatus 610 is installed in the body tube 110 of FIG. 1, the rotation cylinder 655 may be exposed from an external surface of the body tube 110. A user can manually manipulate the rotation cylinder 655, thereby moving the optical units 40 to an open location or a closing location.

The light path adjustment apparatus 610 may include first detection units 85 and 86 that can detect the relative rotation location of the rotation plate 70 with respect to the support plate 90. The first detection units 85 and 86 can be located corresponding to a projection plate 77 projecting from an outside portion of the rotation plate 70, so that the first detection units 85 and 86 may detect whether the rotation plate 70 is located corresponding to the open locations of the first optical unit 20 and the second optical unit 30 or the closing locations thereof. The first detection units 85 and 86 may be realized as, for example, an optical detection sensor.

Figure 16:
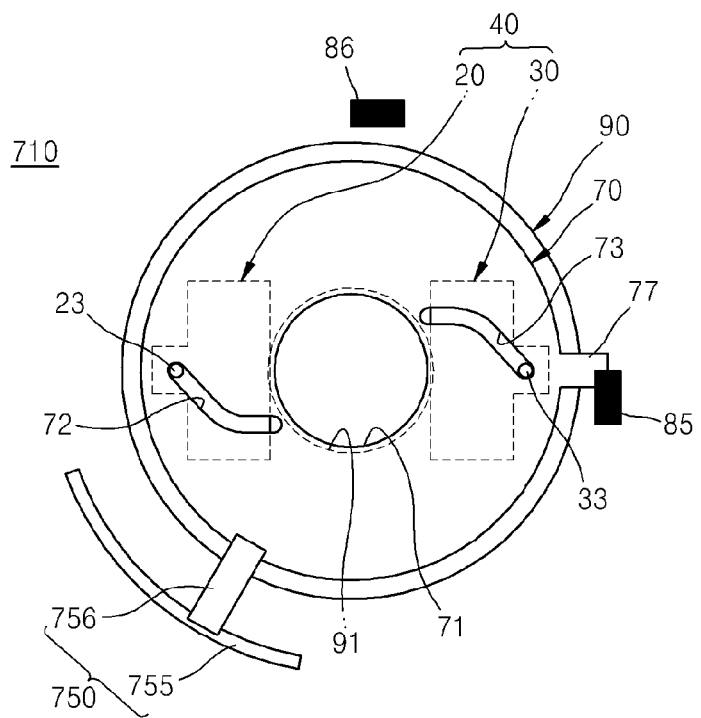
FIG. 16 is a plan view of a light path adjustment apparatus according to another embodiment.

FIG. 16 is a plan view of a light path adjustment apparatus 710 according to another embodiment. The light path adjustment apparatus 710 is similar to the light path adjustment apparatus 610 of FIG. 6, but is different in that a manual driving unit 750 is modified. That is, the manual driving unit 750 can include a connection plate 756 that can be coupled to an external edge of the rotation plate 70 and a lever 755 that can be connected to the connection plate 756. The lever 755 can also be rotatably coupled to an outside portion of the rotation plate 70.

If the light path adjustment apparatus 710 including the lever 755 is installed in the body tube 110 of FIG. 1, the lever 755 may be exposed from a partial region of an outside portion of the body tube 110.

Figure 17:
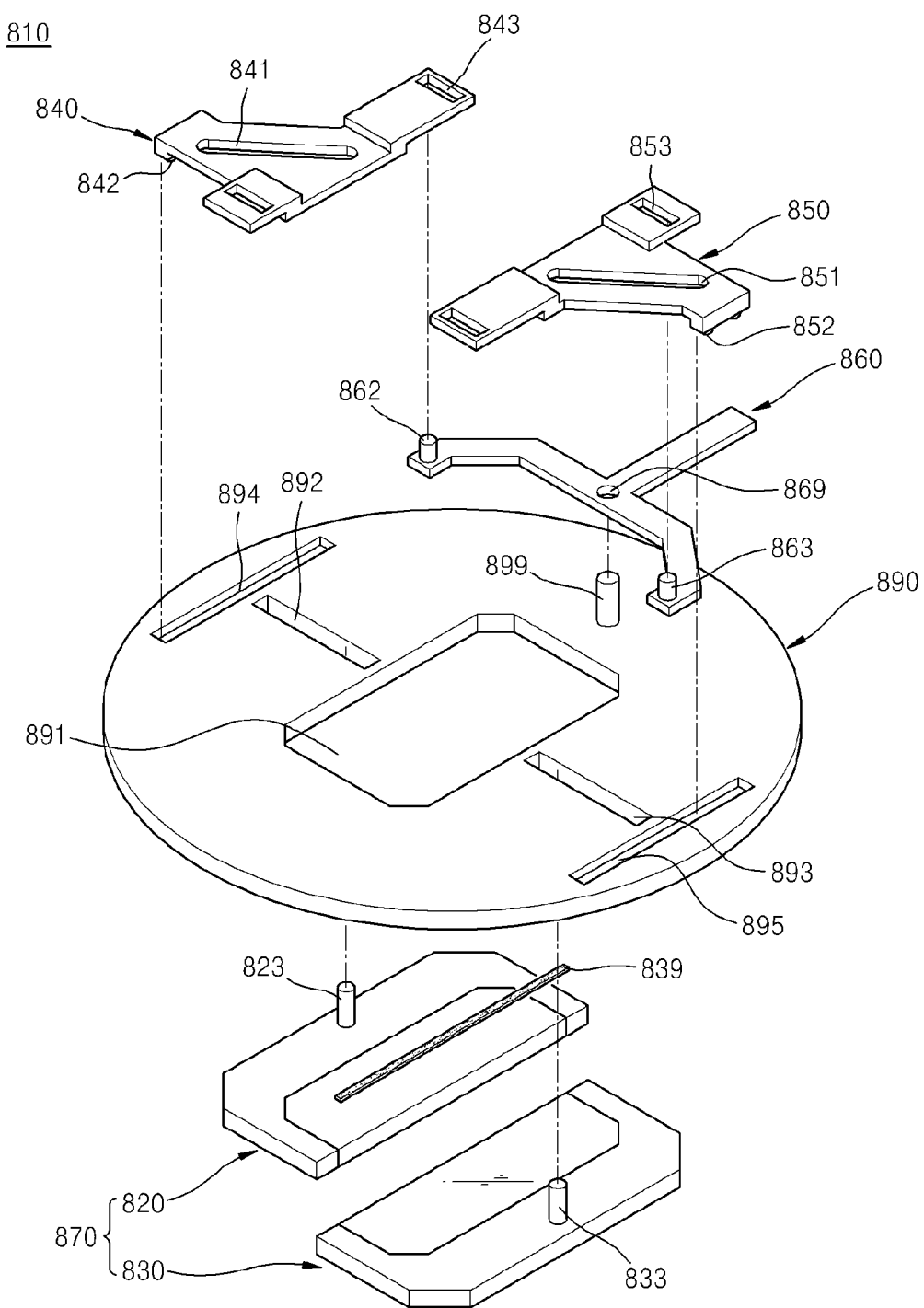
FIG. 17 is a schematic exploded view of a light path adjustment apparatus according to another embodiment.
Figure 18:
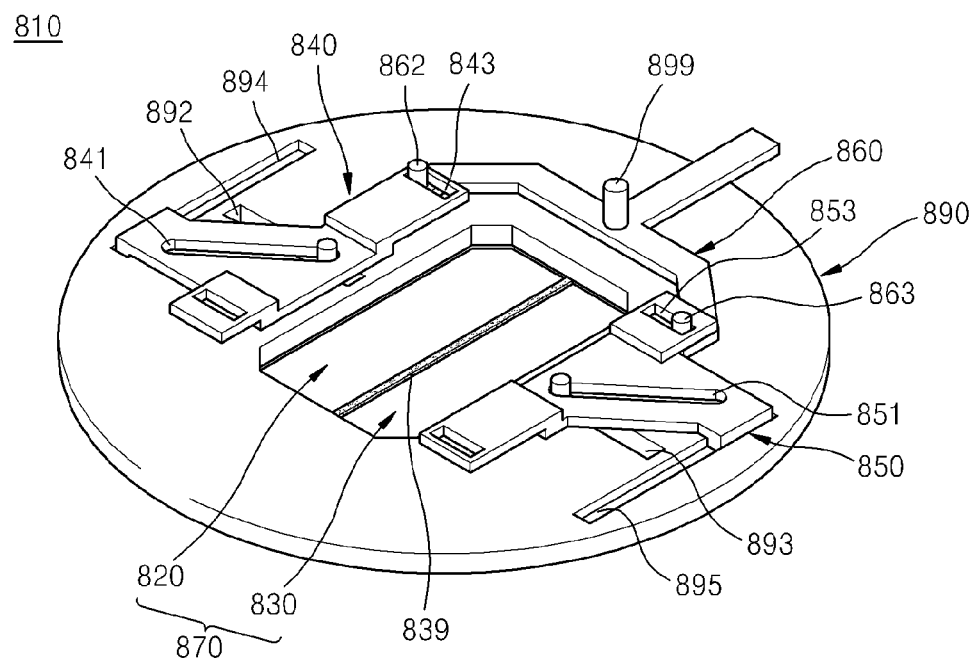
FIG. 18 is a plan view of the light path adjustment apparatus of FIG. 17 in a coupling state.

FIG. 17 is a schematic exploded view of a light path adjustment apparatus 810 according to another embodiment. FIG. 18 is a plan view of the light path adjustment apparatus 810 of FIG. 17 in a coupling state.

Referring to FIGS. 17 and 18, the light path adjustment apparatus 810 can include a support plate 890 that can include a first through hole 891 and a plurality of optical units 870 that can be movably disposed and can open or close the first through hole 891.

The optical units 870 can include a first optical unit 820 corresponding to a first region of the first through hole 891 and a second optical unit 830 corresponding to a second region of the first through hole 891. The first optical unit 820 and the second optical unit 830 can include coupling pins 823 and 833 that can project toward the support plate 890, respectively.

A shading plate 839 can be disposed in a boundary surface between the first optical unit 820 and the second optical unit 830 to prevent light from leaking therethrough.

The support plate 890 can include guide grooves 892 and 893 that can be coupled to the coupling pins 823 and 833, respectively, and can outwardly extend from the first through hole 891 to guide movements of the coupling pins 823 and 833.

The light path adjustment apparatus 810 can include cam plates 840 and 850 that can be coupled to the support plate 890 and move in directions that cross directions in which the first optical unit 820 and the second optical unit 830 move. Sliding grooves 894 and 895 that guide rectilinear motions of the cam plates 840 and 850 can extend in directions approximately perpendicular to directions in which the guide grooves 892 and 893 extend in the support plate 890. Sliding projections 842 and 852 of the cam plates 840 and 850 can be coupled to the sliding grooves 894 and 895 of the support plate 890, respectively.

The cam plates 840 and 850 can include cam grooves 841 and 851 that can extend at an incline across extension directions of the guide grooves 892 and 893. End portions of the coupling pins 823 and 833 of the first optical unit 820 and the second optical unit 830, which can pass through the guide grooves 892 and 893, can be coupled to the cam plates 841 and 851, respectively. The cam plates 840 and 850 can perform motions along the sliding grooves 894 and 895 so that forces of the cam plates 840 and 850 can be transferred to the coupling pins 823 and 833, which can be engaged with the cam grooves 841 and 851. Thus, driving forces of the cam plates 840 and 850 may enable the first optical unit 820 and the second optical unit 830 to perform a sliding motion.

Coupling projections 862 and 863 of a driving force transfer lever 860 can be connected to connection grooves 843 and 853 which can be formed on one sides of the cam plates 840 and 850, respectively. A rotation hole 869 of the driving force transfer lever 860 can be coupled to a support projection 899 that can project from the support plate 890. Thus, if a rotational force for rotating the driving force transfer lever 860 is transferred from outside, the driving force transfer lever 860 may perform a rotational motion with respect to the support projection 899.

A method of transferring the rotational force of the driving force transfer lever 860 may use a driving motor, a pneumatic cylinder, or a mechanical or electronic solenoid device. Alternatively, an end portion of the driving force transfer lever 860 can be exposed from an outside portion of a body tube, and a user can manually manipulate the end portion to transfer the rotational force of the driving force transfer lever 860.

If the driving force transfer lever 860 rotates clockwise when the first optical unit 820 and the second optical unit 830 are disposed in a location where the first through hole 891 is closed, the cam plates 840 and 850 can perform a sliding motion. The rotational force can be transferred through the cam grooves 841 and 851 and the coupling pins 823 and 833 of the cam plates 840 and 850, which can perform the sliding motion, so that the first optical unit 820 and the second optical unit 830 can perform left and right sliding motion and move to a location where the first through hole 891 is opened.

Figure 19:
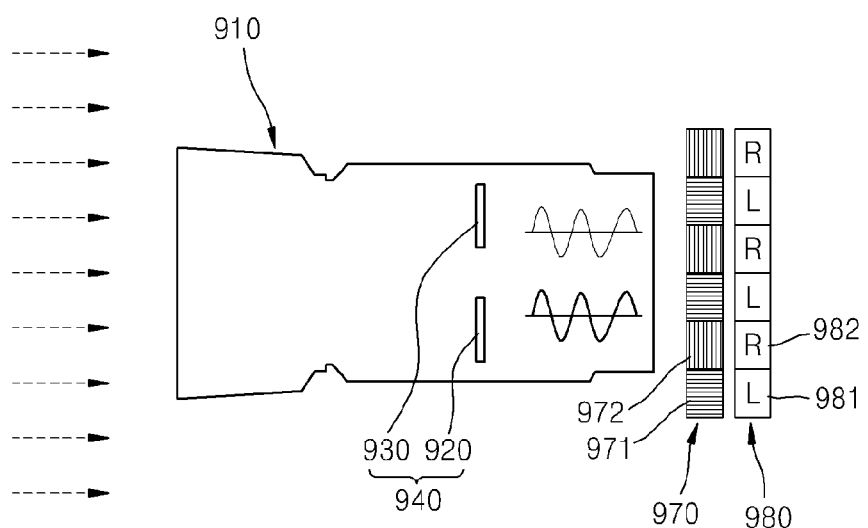
FIG. 19 is a conceptual diagram of explaining an operation principle of a photographing apparatus including a light path adjustment apparatus according to another embodiment.

FIG. 19 is a conceptual diagram of explaining an operation principle of a photographing apparatus including a light path adjustment apparatus according to another embodiment. FIG. 19 shows only an optical unit 940 of the light path adjustment apparatus installed in a body tube 910 for descriptive convenience. The optical unit 940 can include a first optical unit 920 and a second optical unit 930 that can be located on a light path or externally beyond the light path. Light that passes through the body tube 910 can be incident upon an imaging device 980.

The first optical unit 920 and the second optical unit 930 may block a part of light that passes therethrough. That is, the first optical unit 920 and the second optical unit 930 may pass light within different optical ranges. For example, the first optical unit 920 and the second optical unit 930 may be color filters that pass different colors of light. For example, the first optical unit 920 may pass red light, and the second optical unit 930 may pass blue light.

Alternatively, the first optical unit 920 and the second optical unit 930 may be polarized filters that pass light of a wavelength having different phases. The first optical unit 920 may pass light of a wavelength of an S wave, and the second optical unit 930 may pass light of a wavelength of a P wave.

The first optical unit 920 and the second optical unit 930 of FIG. 19 can pass light of a wavelength having different phases. Thus, when the first optical unit 920 and the second optical unit 930 are located on a light path in the body tube 910 to capture a 3D image, light that passes through the first optical unit 920 and the second optical unit 930 can be divided into the light of the wavelength of the S wave and the light of the wavelength of the P wave.

A polarized filter 970 that can function as a light division filter can be disposed in front of the imaging device 980. The polarized filter 970 can include a first filter element 971 that can pass the light of the wavelength of the S wave and a second filter element 972 that can pass the light of the wavelength of the P wave.

The first filter element 971 and the second filter element 972 can be disposed to repeatedly cross each other. During capturing of a 3D image, the imaging device 980 can be divided into first pixels 981 that can capture a left image and second pixels 982 that can capture a right image. That is, light that passes through the first filter element 971 can be incident upon the first pixels 981, and light that passes through the second filter element 972 is incident upon the second pixels 982, thereby obtaining a 3D image by capturing a first image obtained from the light that passes through the first optical unit 920 and a second image obtained from the light that passes through the second optical unit 930.

Alternatively, the first optical unit 920 and the second optical unit 930 may use a neutral density (ND) filter, that is, an optical filter for adjusting a quantity of incident light. The ND filter may be used by setting different wavelength ranges of light to adjust a quantity of light of each of the first optical unit 920 and the second optical unit 930.

Figure 20:
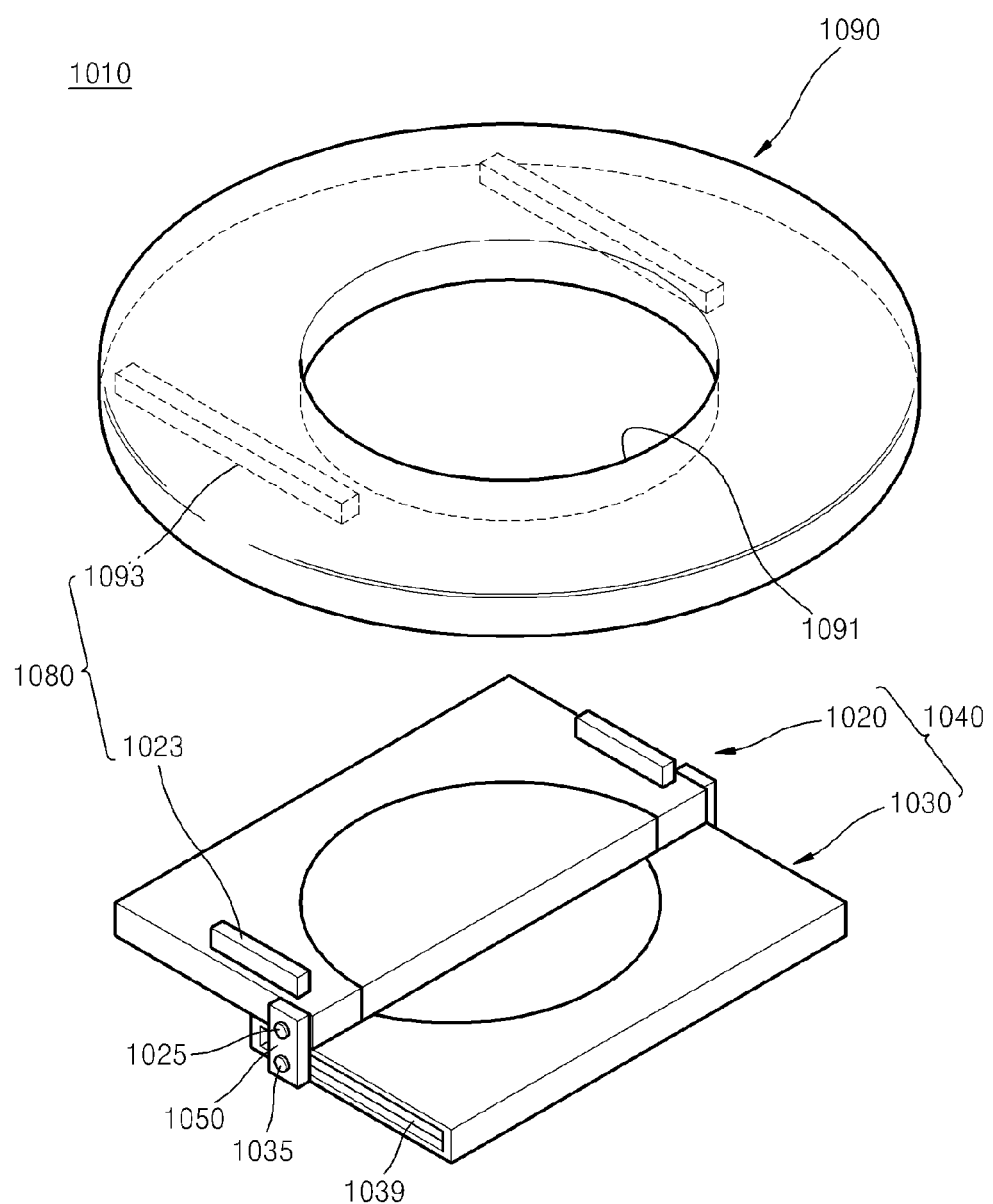
FIG. 20 is a schematic exploded view of a light path adjustment apparatus according to another embodiment.

FIG. 20 is a schematic exploded view of a light path adjustment apparatus 1010 according to another embodiment. Referring to FIG. 20, the light path adjustment apparatus 1010 can include a support plate 1090 that can include a first through hole 1091 through which light passes and a plurality of optical units 1040 that can be movably disposed and that can open or close the first through hole 1091.

The optical units 1040 can include a first optical unit 1020 corresponding to a first region that is a partial region of the first through hole 1091 and a second optical unit 1030 corresponding to a second region that is a remaining region thereof.

In the previous embodiments, first and second optical units 1020 and 1030 can move toward the outside of a first through hole and move in opposite directions away from the first through hole. The first optical unit 1020 and the second optical unit 1030 of the light path adjustment apparatus 1010 can move in the same direction away from the first through hole 1091 when the first optical unit 1020 and the second optical unit 1030 move away from the first through hole 1091 to open the first through hole 1091.

To move the first optical unit 1020 and the second optical unit 1030 in the same direction away from the first through hole 1091, the first optical unit 1020 and the second optical unit 1030 can be coupled to each other via a hinge unit 1050. One side of the hinge unit 1050 can be rotatably coupled to the first optical unit 1020 via a first hinge pin 1025, and another end thereof can be rotatably coupled to the second optical unit 1030 via a second hinge pin 1035.

The second hinge pin 1035 can be inserted into a sliding guide 1039 that can extend along a side surface of the second optical unit 1030, and thus the second optical unit 1030 may slidably move toward or away from the first optical unit 1020.

Further, the first optical unit 1020 can be coupled to the support plate 1090 to perform a rectilinear motion with respect to a rectilinear guide 1080. The rectilinear guide 1080 can include a sliding groove 1093 formed in the support plate 1090 and a slider 1023 projecting from the first optical unit 1020 and inserted into the slider 1023 into the sliding groove 1093. Embodiments are not limited to the rectilinear guide 1080, and the rectilinear guide 1080 may be modified to couple the first optical unit 1020 to the support plate 1090 so as to perform the rectilinear motion.

To move the first optical unit 1020 and the second optical unit 1030 to a closing location where the first through hole 191 is closed, the first optical unit 1020 can move toward the first through hole 1091 along the sliding groove 1093. Simultaneously, due to the sliding guide 1039 of the second optical unit 1030 slidably supported by the second hinge pin 1035, the second optical unit 1030 can move away from the first optical unit 1020.

If the second optical unit 1030 moves so that a left end portion of the sliding guide 1039 contacts the second hinge plate 1035, the hinge unit 1050 can rotate counterclockwise with respect to the first optical unit 1020, and the second optical unit 1030 can rotate around the second hinge plate 1035 clockwise with respect to the hinge unit 1050. Thus, surfaces of the first optical unit 1020, the second optical unit 1030, and the hinge unit 1050 can be unfolded, thereby closing the first through hole 1091.

To move the first optical unit 1020 and the second optical unit 1030 to an opening location where the first through hole 1090 is opened, the hinge unit 1050 can rotate, and simultaneously the second optical unit 1030 can move to a location where the first optical unit 1020 and the second optical unit 1030 overlap, due to the sliding guide 1039 of the second optical unit 1030 slidably supported by the second hinge pin 1035. Further, the first optical unit 1020 can move toward the outside of the first through hole 1091 along the sliding groove 1093.

As described above, a photographing apparatus can block a part of light that passes through a light path adjustment apparatus or pass an entire light path, thereby selectively capturing a 2D image or a 3D image.

Further, a plurality of optical units that enable capturing of a 3D image can move toward the outside of a first through hole, thereby simply capturing the 3D image without adding a driving device or mechanical elements.

Furthermore, the optical units can move between an open location and a closing location, thereby obtaining a sufficient quantity of light in a 2D photographing mode.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Also, using the disclosure herein, programmers of ordinary skill in the art to which the invention pertains can easily implement functional programs, codes, and code segments for making and using the product. The words "mechanism" and "element" are used broadly and are not limited to mechanical or physical embodiments, but may include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". It will be recognized that the terms "comprising," "including," and "having," as used herein, are specifically intended to be read as open-ended terms of art.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the claims. Therefore, the scope of the invention is defined not by the detailed description of the invention but by the following claims, and all differences within the scope will be construed as being included in the invention.

What is claimed is:

1. A light path adjustment apparatus comprising:
   a support plate comprising a first through hole through which light passes; and
   a plurality of optical units that move between an open location where the first through hole is opened by the optical units moving toward an outside of the first through hole and a closing location where the first through hole is divided into a plurality of regions by the plurality of optical units moving toward the first through hole, the plurality of optical units blocking at least a part of the light in the closing location,
   wherein each of the plurality of optical units comprises a liquid crystal device that operates according to an externally applied signal and passes or blocks the light according to a time dependence of the externally applied signal,
   wherein upon receiving a first signal from a control unit operating in a 2D photographing mode, the light path adjustment apparatus provides light to an imaging device when the plurality of optical units are disposed in the open location, to generate a single image incident through the first through hole, and
   wherein upon receiving a second signal from the control unit operating in a 3D photographing mode, the light path adjustment apparatus provides light to the imaging device when the plurality of optical units are disposed in the closed location, to generate a plurality of images incident through the plurality of optical units.

2. The light path adjustment apparatus of claim 1, wherein the plurality of optical units comprise an optical filter that passes light within different optical ranges.

3. The light path adjustment apparatus of claim 1, further comprising:
   a rotation plate comprising a second through hole corresponding to the first through hole and rotatably disposed with respect to the support plate,
   wherein the plurality of optical units comprise a first optical unit corresponding to a first region of the first through hole, and a second optical unit corresponding to a second region of the first through hole, and
   wherein the first optical unit and the second optical unit are coupled to the support plate and the rotation plate, respectively, and move between a 2D photographing location and a 3D photographing location when the rotation plate rotates.

4. The light path adjustment apparatus of claim 3, wherein the first optical unit and the second optical unit are rotatably coupled to the support plate.

5. The light path adjustment apparatus of claim 3, wherein the first optical unit and the second optical unit are coupled to the support plate by a rectilinear guide to perform a rectilinear motion.

6. The light path adjustment apparatus of claim 5, wherein the first optical unit and the second optical unit each comprise a projection portion, and the rotation plate comprises a groove portion into which at least one of the projection portion of the first optical unit and the projection portion of the second optical unit is inserted.

7. The path adjustment apparatus of claim 5, wherein the rotation plate comprises at least two projection portions, and each of the first optical unit and the second optical unit comprises a groove portion into which at least one of the at least two projection portions is inserted.

8. The light path adjustment apparatus of claim 3, further comprising: a first detection unit that detects a relative location of the rotation plate with respect to the support plate.

9. The light path adjustment apparatus of claim 1, further comprising: a second detection unit that detects relative locations of the plurality of optical units with respect to the support plate.

10. The light path adjustment apparatus of claim 1, further comprising: an elastic member that elastically biases at least one of the plurality of optical units toward the first through hole or toward the outside of the first through hole.

11. The light path adjustment apparatus of claim 1,
    wherein each of the plurality of optical units comprises a first optical unit corresponding to a first region of the first through hole and a second optical unit corresponding to a second region of the first through hole, each of the first optical unit and the second optical unit comprising a coupling pin,
    wherein the support plate comprises a guide groove outwardly extending from the first through hole and coupled to at least one of coupling pin of the first optical unit and the coupling pin of the second optical unit so as to guide a movement of the coupling pin, and
    further comprising: cam plates coupled to the support plate to move in a direction crossing the extension direction of the guide groove and comprising cam grooves extending at an incline with respect to the guide groove.

12. The light path adjustment apparatus of claim 1, wherein the plurality of optical units comprise a first optical unit corresponding to a first region of the first through hole, a second optical unit corresponding to a second region of the first through hole, and a hinge unit having a first end rotatably coupled to the first optical unit and a second end rotatably coupled to the second optical unit, and
    wherein the first optical unit is coupled to the support plate to perform a rectilinear motion by a rectilinear guide, and the second optical unit comprises a sliding guide slidably supporting the second end of the hinge unit so that the second optical unit slidably moves toward the first optical unit.

13. The light path adjustment apparatus of claim 1, wherein the plurality of optical units are disposed in such a way that neighboring boundary surfaces of the plurality of optical units partially overlap when the plurality of optical units are in the closing location.

14. The light path adjustment apparatus of claim 1, further comprising: a shading plate disposed on a surface of one side of one optical unit to cover neighboring boundary surfaces of at least another one of the plurality of optical units when the plurality of optical units are in the closing location.

15. The light path adjustment apparatus of claim 1, further comprising: a shading plate disposed in a side surface of one optical unit to contact other side surfaces of neighboring optical units when the plurality of optical units are in the closing location.

16. A photographing apparatus comprising:
a light path adjustment apparatus comprising:
- a support plate comprising a first through hole through which light passes; and
- a plurality of optical units that move between an open location where the first through hole is opened by the plurality of optical units moving toward an outside of the first through hole and a closing location where the first through hole is divided into a plurality of regions by the plurality of optical units moving toward the first through hole, the plurality of optical units blocking at least a part of the light in the closing location,
- wherein each of the plurality of optical units comprises a liquid crystal device that operates according to an externally applied signal and passes or blocks the light according to a time dependence of the externally applied signal;

an imaging device that converts light that passes through the light path adjustment apparatus into an electrical signal; and a control unit that performs photographing by controlling the imaging device, and that selects a 2D photographing mode in which, when the plurality of optical units are disposed in the open location, a single image incident through the first through hole is obtained, or a 3D photographing mode in which, when the plurality of optical units are disposed in the closing location, a plurality of images incident through the plurality of optical units are obtained.

17. The photographing apparatus of claim 16,
wherein at least one of the plurality of optical units comprises
- optical filters that pass light within different optical ranges, and
- light dividing filters disposed in front of the imaging device that divide light incident through the plurality of optical units.

18. The photographing apparatus of claim 16, further comprising:
a driving unit that moves the plurality of optical units,
wherein the control unit controls the driving unit and selects the 2D photographing mode or the 3D photographing mode.

* * * * *

UNITED STATES PATENT AND TRADEMARK OFFICE
CERTIFICATE OF CORRECTION

| | | |
|---|---|---|
| PATENT NO. | : 8,662,766 B2 | Page 1 of 1 |
| APPLICATION NO. | : 13/150506 | |
| DATED | : March 4, 2014 | |
| INVENTOR(S) | : Ki-oh Jung et al. | |

It is certified that error appears in the above-identified patent and that said Letters Patent is hereby corrected as shown below:

ON THE TITLE PAGE:

Add

(30) Foreign Application Priority Data
Oct. 4, 2010   (KR).............. 10-2010-0096519

Signed and Sealed this
Twenty-third Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,662,766 B2  
APPLICATION NO. : 13/150506  
DATED : March 4, 2014  
INVENTOR(S) : Ki-oh Jung et al.

Page 1 of 1

It is certified that error appears in the above-identified patent and that said Letters Patent is hereby corrected as shown below:

ON THE TITLE PAGE:

Add after Item (22)

(30) Foreign Application Priority Data  
Oct. 4, 2010 (KR)............ 10-2010-0096519

Signed and Sealed this  
Thirtieth Day of September, 2014

Michelle K. Lee  
*Deputy Director of the United States Patent and Trademark Office*